Nov. 30, 1954   E. C. NOVOTNY   2,695,556
APPARATUS FOR TREATING PACKAGED GOODS
Filed April 5, 1951   2 Sheets-Sheet 1
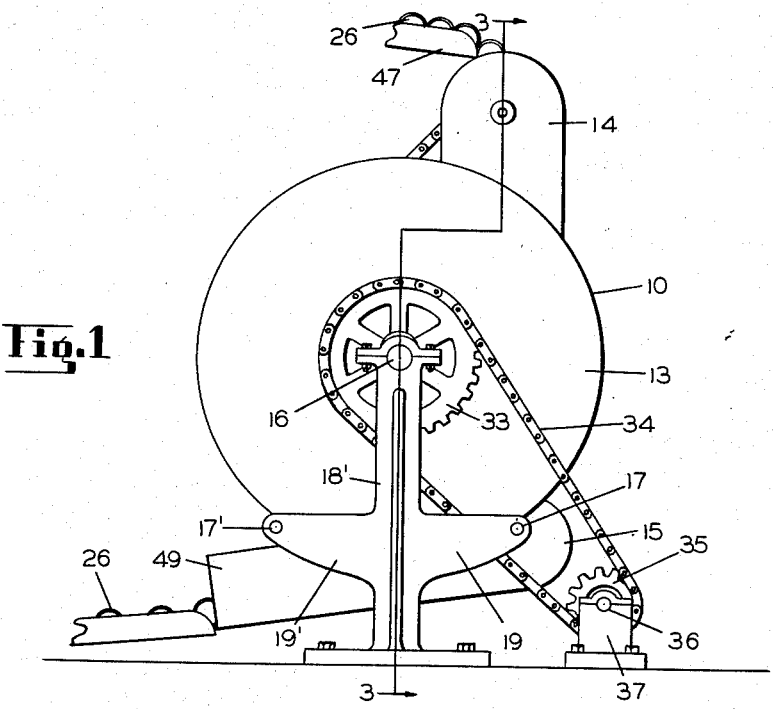
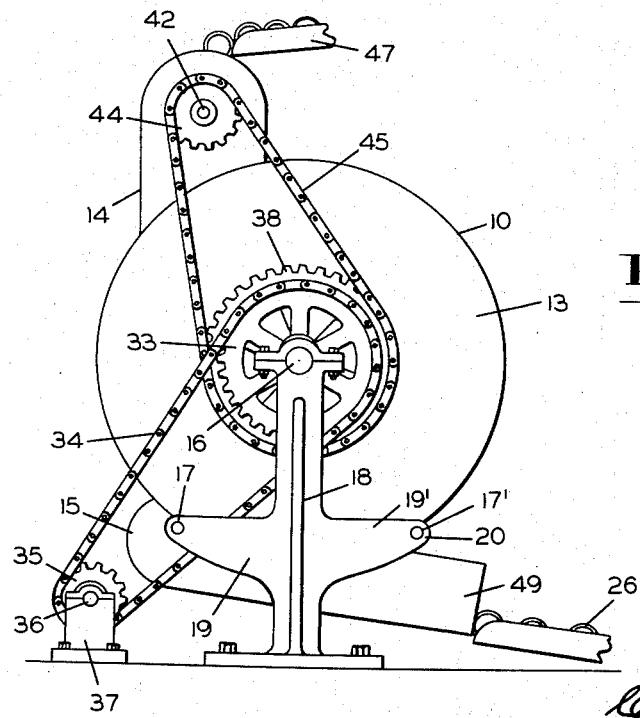
INVENTOR.
EDWARD C. NOVOTNY
BY
Christian L. Nielsen
ATTORNEY.

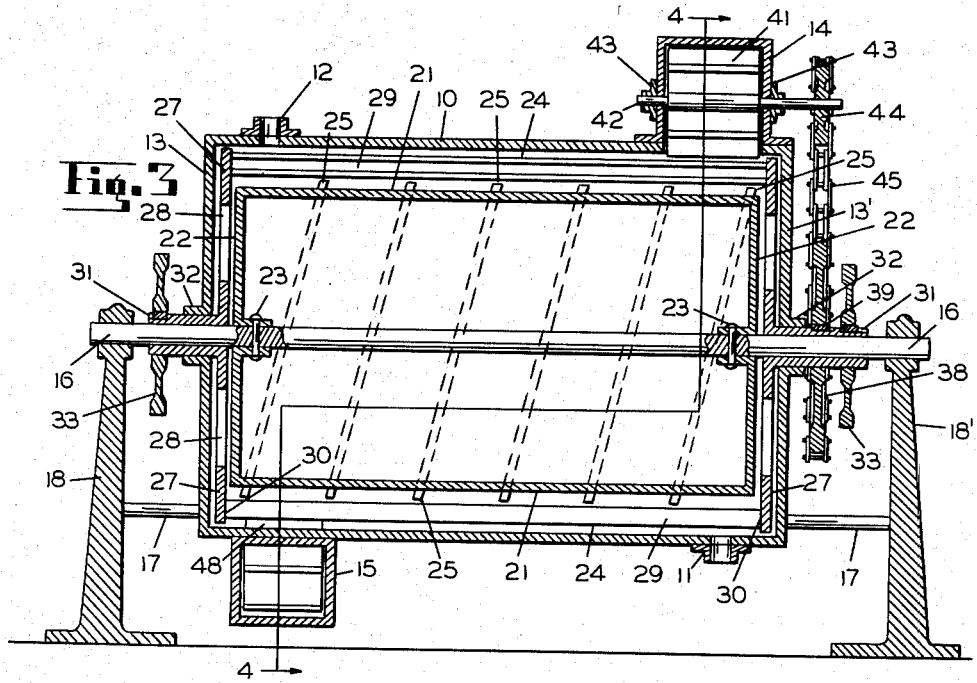
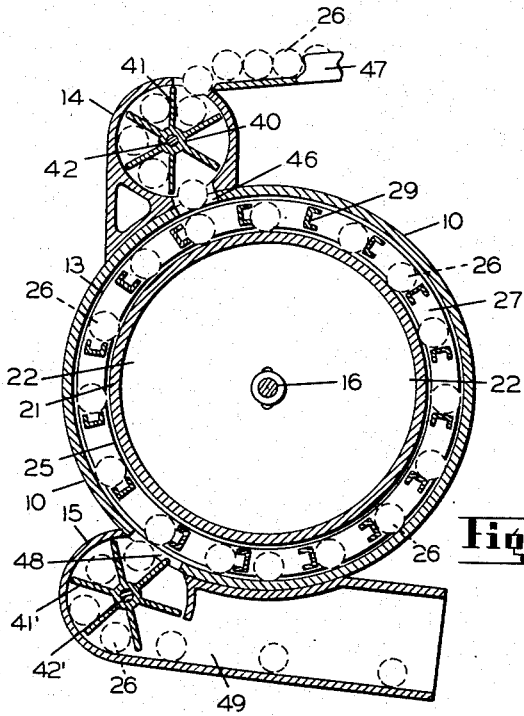
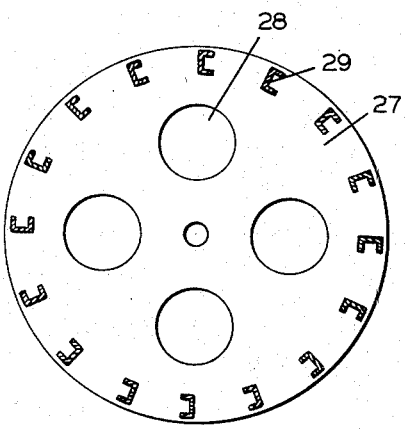
INVENTOR.
EDWARD C. NOVOTNY

2,695,556

APPARATUS FOR TREATING PACKAGED GOODS

Edward C. Novotny, Milwaukee, Wis.

Application April 5, 1951, Serial No. 219,422

1 Claim. (Cl. 99—365)

My invention relates to an apparatus for treating packaged goods, and more particularly to an apparatus for treating materials sealed in tin containers.

The object of my invention is to provide a means for submerging and conveying a plurality of tin containers filled with food stuffs or the like through a heated chamber at a governed speed to pre-determine the length of time that the cans of food are being processed.

It is manifest to anyone familiar with the canning industry that the processing of food sealed in tin can type of containers, requires that the cans be submerged in steam or heated water for a pre-determined length of time to properly process the food, and that the different types of foods require a different time element to properly perform the processing operation. The device specified, illustrated and claimed herein provides a positive means for controlling the time for the processing cycle, and provides a positive agitation of the product within the can, due to the continuous revolving of the can to insure equal treatment of every particle. The device is positive in its performance and enables a continuous, uninterrupted cycle in the processing operation. It may be constructed for heating or cooling purposes, is economical to manufacture, and is extremely simple to manipulate.

Other and further objects of my invention will become more apparent as the description proceeds, when taken in conjunction with the drawings in which:

Figure 1 is a side view of the device constituting my invention showing a portion of the feeding conveyor and the outlet conveyor.

Figure 2 is a view of the opposite side of the device illustrating the drive for the feeding mechanism.

Figure 3 is a longitudinal cross-section of the device taken at the line 3—3 in Figure 1.

Figure 4 is a lateral cross-sectional view of the device taken at the line 4—4 in Figure 3, and Figure 5 is a side or plan view of the conveyor end plate showing the channels attached thereto, the channels being shown in cross-section.

Similar characters of reference indicate corresponding parts throughout the several views, and referring now to the same, the character 10 shows a cylindrical outer shell horizontally disposed, the shell or drum 10 is shown of a single wall construction, but it may be supplied with insulating material (not shown) on its outer face. There is a tubular inlet port shown as 11 at the bottom of the drum 10, and a tubular outlet port shown as 12 on the top of the drum 10 near the opposite ends thereof. The drum 10 is provided with vertical end walls shown as 13 and 13', and a top housing 14 is shown extending outward from the outer peripheral surface of the outer drum 10 at one end near the top thereof, and another housing shown as 15 projects outward from the outer peripheral surface of the drum 10 near the bottom thereof, on the opposite end. The drum 10 rests on its bottom on a pair of rest-rods shown as 17 and 17' which are supported by bearing members vertically disposed and acting as supports for a shaft 16. These bearing members shown as 18 and 18' have outwardly extending members 19 and 19' which act as attaching means for the rods 17 and 17' which are attached to the members 19 and 19' at 20.

There is an inside cylinder or drum shown as 21 which is of a smaller diameter than the drum 10, and somewhat shorter in length. This inside cylinder or drum 21 is provided with vertical side walls 22, which are attached to the shaft 16 at 23. The arrangement of the inside cylinder within the outside cylinder 10 provides a space 24 between the cylinders 10 and 21.

There is a conveyor flange which is of a spiral contour shown as 25 which extends outward from the outer periphery of the inner drum 21. This spiral flange is employed for conveying the tin cans shown as 26, as they are rotatably moved around the outer peripheral surface of the inner drum or cylinder 21.

Disposed between the vertical end walls of the inside and outside cylinders 21 and 10 respectively are vertical conveyor plates 27 as shown in Figure 5 provided with a plurality of apertures 28, and a plurality of cross-members shown as channels 29 are attached at 30 to the inner faces of the conveyor plates 27. The plates 27 on both sides have outwardly extending bearings shown as 31 which encircle the outer peripheral surface of the horizontal shaft 16, and there are sprockets shown as 33 keyed to the bearings 31. There are also outwardly extending bearings shown as 32 and 32' extending outward from the end walls 13 and 13', and a drive chain 34 extends over a portion of the outer surface of the sprocket 33 and over a sprocket 35 which is shown attached to a jack shaft 36, which jack shaft 36 is rotatably mounted in bearings 37 attached to the floor. The shaft 36 is actuated by means of an electric motor or the like (not shown), and another sprocket 38 is attached at 39 to the bearing 31, which extends outward from the plate 27.

There is a top housing 14 and a bottom housing 15, and encased within the housings 14 and 15 are shown sealing mechanisms 40 and 40' respectively. These sealing mechanisms are comprised of outwardly extending vanes 41 and 41' attached to the shafts 42 and 42'. The shaft in the housing 14 is shown journalled at 43 in the side walls of the housing 14 and extends outward at one end to accommodate a sprocket 44 which is connected to the sprocket 38 by means of a chain shown as 45.

Chains are shown throughout the several views, but belts may be employed for the operation of the device, or any portion thereof.

The outer cylindrical shell or drum 10 is equipped with an inlet opening 46 covered by the housing 14 to accommodate the cans 26 being fed by means of a conveyor 47. The cans 26 roll and rotate on the inclined conveyor, and are lifted one at a time by the vanes 41 of the sealing mechanism 40 on the leading end of the device. There is another opening 48 covered by the housing 15, which opening acts as an outlet in the outer cylindrical shell 10 and permits the cans 26 to drop to another conveyor shown as 49. As the cans 26 leave the shell 10, they will engage the individual vanes of the sealing mechanism 40' within the housing 15, and turn the sealing mechanism 40' due to the weight of the can disposed on the top of one of the vanes 41'.

The operation of the device is simple, and the performance of the device is positive. The jack shaft 36 is revolved by means of an actuating device such as an electric motor (not shown) through a variable speed transmission (not shown), and by the revolving of the drive shaft 36, the sprockets 35, which are connected by the chain 34 to the sprocket 33 will cause the circular plate 27 to revolve. The plates 27 are connected to one another by means of cross members 29 which are in the form of channels. The cans shown as 26 rotatably travel by gravity on the incline conveyor chute 47 toward the feeding mechanism 40 where they are picked up one at a time by the blade 41 forming a part of the feeding mechanism 40 when it is revolved as shown by the arrow in Figure 4. The revolving of the feeding mechanism 40 is accomplished by causing the shaft 42 to turn due to the chain 45 engaging the sprocket 44 mounted on the shaft 42, and the sprocket shown as 38 mounted on the bearing 31 on one of the plates 27. By referring to Figure 4, it will be noted that the cans 26 which are shown in phantom are deposited through the opening 46 to the outer periphery of the inner drum or cylinder 21, and are rotatably carried upward to the top of the drum 21 by the flanges of the channels 29, and as they reach the apex of the drum 21, they will be caused to roll against the back plate of the channel 29, and then downward in a path between the spiral guides 25 engaging the outer peripheral surface of the inner drum 21 until they reach the extreme bottom where they are again pushed upward by the flanges on the channels 29. Obviously, while at the lower half of the device the cans will roll along the inner face of the outer drum 10, and at the upper half of the device they contact the outer surface of the inner shell or drum 21. The space 24 between the drums 21 and 10 being greater than the diameter of the cans 26 will permit free revolving of the cans 26 in their spiral path around the inner drum 21, guided by the spirally disposed conveyor flange 25 which extends outward from the outer periphery of the surface of the inner drum 21.

When the cans reach a point immediately above the opening 48 near the bottom of the outer shell 10, they will be permitted to drop onto the incline conveyor 49 by contacting first one of the vanes 40', where the weight of the can will revolve the entire sealing unit, and thus permit the can 26 to engage the conveyor 49, and the close contact of the outer edges of the vanes 40' against the inner wall of the housing 15 will seal the enclosure.

Obviously, the ratio of the sprockets 44 and 38 must be such that the revolving of the sprocket 38 will synchronize the movement of the vanes 41 in the feeding mechanism, so that the cans 26 will be picked up and deposited in proper alignment between the spiral guides 25. The speed of revolution of the conveyor plate 27 will determine the length of time each can will be disposed between the inner and outer cylinder, which space 24 may be filled with live steam or the like entering at the tubular opening 11, and exhausting at the tubular opening 12, in the outer cylinder. The variable speed transmission (not shown) will determine the R. P. M. of the conveyor in its path around the outer periphery of the inner drum 21.

The cans being treated are moved by means of the channel members 29 which in turn are driven by the plates 27. The spiral flange 25 causes the cans to travel from one end of the assembly to the other, and since the ends of the shaft 16 are rotatably journaled in the upper ends of the bearing members 18, the machine will not become damaged, as for example due to jamming of the cans, since the inner cylinder 21 can move sufficiently so that damage to the parts will be prevented.

In the chosen embodiments of my invention exemplified by the accompanying drawings, there are features not heretofore revealed or employed, and although I have shown a particular arrangement of the component parts constituting the device, I am fully cognizant of the fact that many changes may be made in the form and configuration as well as the arrangement of the parts, without affecting the operativeness or spirit of my invention, or the scope of the appended claim.

Having thus described my invention, what I claim and desire to secure by Letters Patent in the United States is:

In an apparatus for treating canned goods, an outer horizontally disposed drum provided with a treating medium inlet at its lower end and a treating medium outlet at its upper end, said drum further including spaced parallel end walls, a first housing extending from the outer periphery of said drum adjacent the upper end thereof, a second housing positioned diagonally opposite said first housing and extending from said drum, a pair of spaced parallel bearing members each including outwardly extending portions, a pair of horizontally disposed rods extending between said outwardly extending portions for supporting said drum, a cylinder positioned within said drum and being smaller than the latter to provide a space therebetween for the passage therethrough of cans being handled, a horizontally disposed shaft extending through said drum and cylinder and rotatably journaled in the tops of said bearing members, said cylinder including a pair of spaced parallel side walls having inwardly extending portions secured to said shaft, an annular flange extending spirally around the outer surface of said cylinder, a plate interposed between each end of said cylinder and the adjacent end of said drum, a plurality of channel members extending between said pair of plates and secured thereto, a cylindrical bearing extending outwardly from each of said plates and surrounding said shaft, a first sprocket keyed to one of said cylindrical bearings, an endless chain trained over said first sprocket, a jack shaft having a sprocket thereon engaging said chain, a driven shaft rotatably supported in each of said housings, a plurality of radially extending vanes secured to each of said driven shafts, chain and sprockets connecting the driven shaft of said first housing to one of said cylindrical bearings, said outer drum being provided with an inlet opening covered by said first housing, an inclined conveyor for feeding cans to said first housing, there being an outlet opening in the bottom of said drum covered by said second housing, and an inclined conveyor for receiving cans from said second housing.

References Cited in the file of this patent

UNITED STATES PATENTS

| Number | Name | Date |
|---|---|---|
| 1,177,502 | Ewald | Mar. 28, 1916 |
| 1,646,577 | Chapman | Oct. 25, 1927 |
| 1,939,372 | Thompson | Dec. 12, 1933 |
| 2,436,913 | Bourland | Mar. 2, 1948 |